Figure 1:
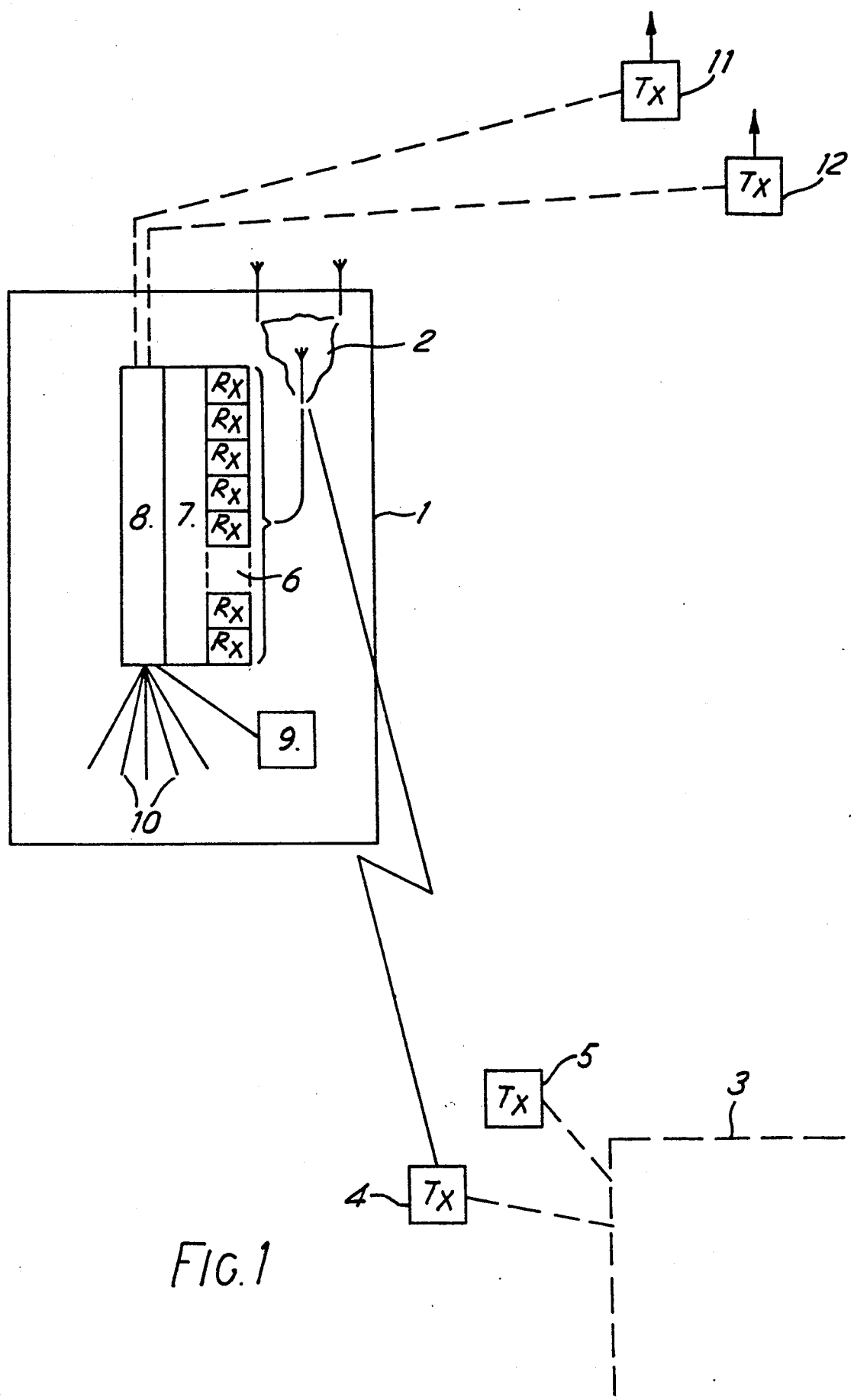

United States Patent [19]

Adams

[11] Patent Number: 5,034,961
[45] Date of Patent: Jul. 23, 1991

[54] AREA COMMUNICATIONS SYSTEM

[75] Inventor: Brian W. P. Adams, Hawkley Hurst, England

[73] Assignees: Software Sciences Limited, Farnborough; The Secretary of State for Defence in Her Britannic Majesty's Government of the United Kingdom of Great Britain and Northern Ireland, London, both of England

[21] Appl. No.: 211,390

[22] Filed: Jun. 3, 1988

[30] Foreign Application Priority Data

Jun. 11, 1987 [GB] United Kingdom ................. 8713680

[51] Int. Cl.$^5$ ............................................. H04K 1/00
[52] U.S. Cl. ............................................ 375/1; 370/941
[58] Field of Search ................ 375/1; 380/34; 370/50, 370/69.1, 70, 94.1, 94.2, 95.1, 45.3; 455/33, 34, 54-57

[56] References Cited

U.S. PATENT DOCUMENTS

| | | | |
|---|---|---|---|
| 3,506,966 | 4/1970 | Magnuski | 375/1 |
| 4,271,524 | 6/1981 | Goodman et al. | 375/1 |
| 4,355,399 | 10/1982 | Timor | 375/1 |
| 4,454,604 | 6/1984 | Myers | 375/1 |
| 4,479,226 | 10/1984 | Prabhu et al. | 375/1 |
| 4,510,595 | 4/1985 | Glance et al. | 370/50 |
| 4,554,669 | 11/1985 | Deman et al. | 375/1 |
| 4,583,231 | 4/1986 | Puckette | 375/1 |
| 4,677,617 | 6/1987 | O'Connor et al. | 375/1 |
| 4,761,796 | 8/1988 | Dunn et al. | 375/1 |
| 4,761,813 | 8/1988 | Gammel | 380/34 |
| 4,807,248 | 2/1989 | Pyatt et al. | 375/1 |
| 4,811,357 | 3/1989 | Betts et al. | 375/1 |
| 4,864,564 | 9/1989 | Parker et al. | 370/94.1 |
| 4,896,151 | 1/1990 | Kuranami et al. | 370/94.1 |
| 4,930,124 | 5/1990 | deBoisseron et al. | 370/94.2 |

FOREIGN PATENT DOCUMENTS 0161649 11/1985 European Pat. Off. .
1605256 9/1986 United Kingdom .
87/05458 9/1987 World Int. Prop. O. .

OTHER PUBLICATIONS

"The Rita Communications System in Service with the French and Belgian Armies", by Robert Salvy, International Defense Review, vol. 15, No. 9, pp. 1216-1218, 1982.

Primary Examiner—Thomas H. Tarcza
Assistant Examiner—Tod Swann
Attorney, Agent, or Firm—Fleit, Jacobson, Cohn, Price, Holman & Stern

[57] ABSTRACT

The radio station comprises a receiver antenna system responsive to direct transmissions from each of the other radio stations in the system with two remote transmitters operated alternately, i.e. one can be moved while the other is transmitting. The antennae system provides input signals to a receiver bank, each receiver being responsive to the current transmission frequency of a respective one of the other radio stations in the system. The received signals, comprising packets of data addressed to a particular station, are processed in decrypt section and switch section, then the data packets are either passed to a database, one of the workstations or rejected, depending on the addressee of each packet. Data from the database or any of the workstations for transmission to specified addresses are processed and stored in the switch section ready to be transmitted from one of the two remote transmitters during one or more subsequent transmission periods.

8 Claims, 2 Drawing Sheets

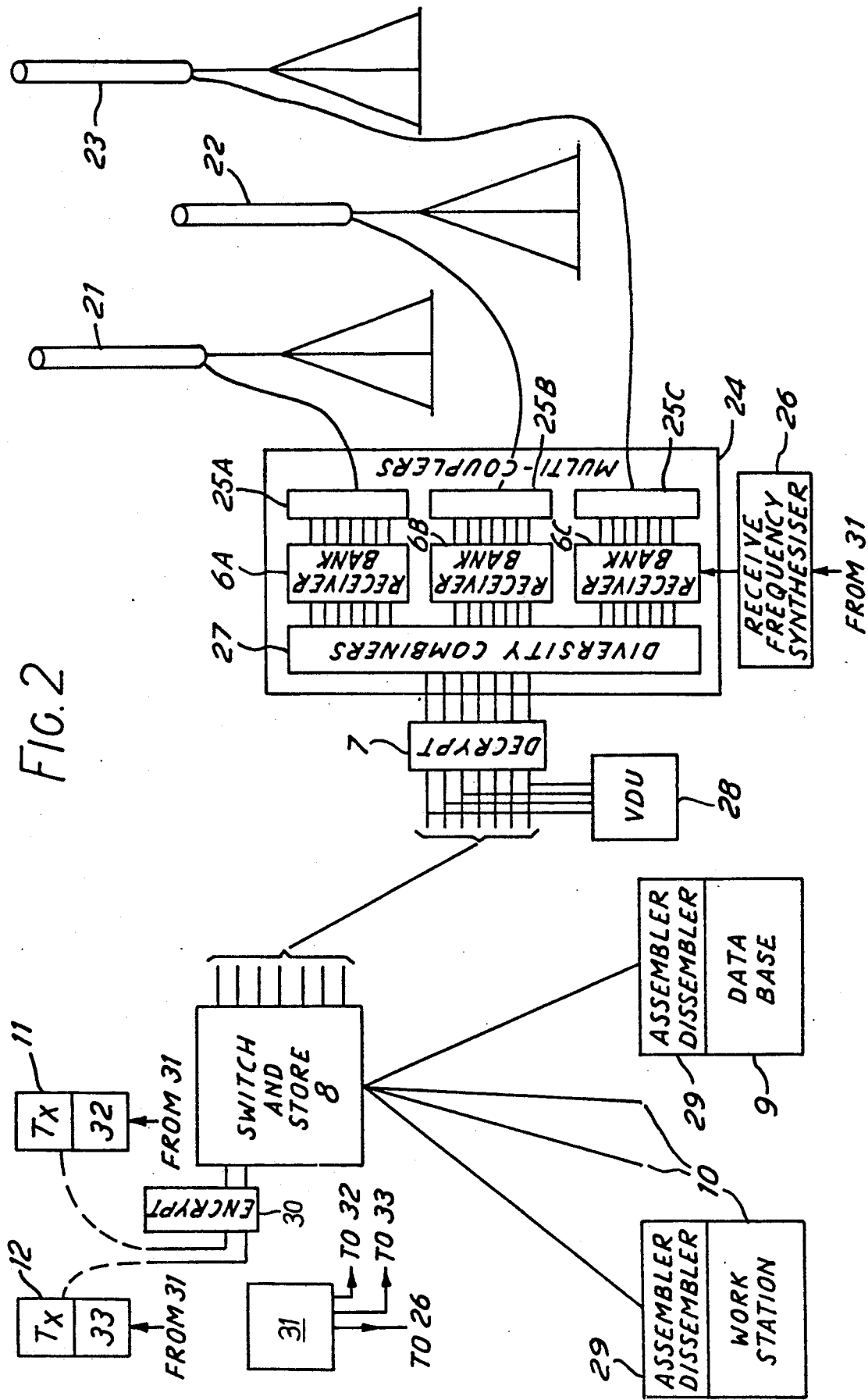

AREA COMMUNICATIONS SYSTEM

This invention relates to an area communications system and in particular, though not exclusively, to such a system for use in battlefield communications between vehicle-mounted radio stations.

Known battlefield communication systems provide continuous multichannel point-to-point transmission of speech, which is encrypted using high speed digital techniques to provide security. A typical system of this type is described in International Defence Review Vol. 15, No. 9, 1982, pp. 1216–1218. The wide bandwidths needed for speech security necessitate use of frequencies in the UHF and lower SHF bands, which are limited to line-of-sight ranges. Consequently, intermediate relay stations, producing a so-called "noded" system, are needed to provide sufficient area coverage.

These known systems have several disadvantages. In particular, a considerable amount of manpower and equipment is needed to provide and operate intermediate stations, thereby making the systems relatively expensive. They are also vulnerable to interception, jamming and physical attack, and use more transmission frequencies and larger bandwidths than is necessary to transmit data for sensor to weapons systems, intelligence systems and logistic computing systems.

Narrow-band data systems, which do not use speech transmission, can be used to transmit over greater distances than the known battlefield systems. However, known narrow-band data systems are generally point-to-multipoint "simplex net" systems, wherein communications can be relatively slow with delayed responses and unclear messages can be caused by colliding messages at the same frequency.

It is therefore an object of the present invention to provide an area communications system which substantially alleviates the problems associated with known systems, particularly when used for military purposes.

According to one aspect of the invention there is provided an area communications system comprising a plurality of radio stations each including means for transmitting signals at a respective predetermined frequency associated with the station to one or more of the other stations and means for receiving signals at different frequencies from one or more of the other stations, said stations being arranged to transmit signals simultaneously at their associated frequencies during a predetermined time period and to receive simultaneously signals at said different frequencies from the other stations, each of said signals comprising one or more packets of data each addressed to one or more of the stations to receive the signal.

Preferably, the system also includes means for changing the respective transmission frequencies associated with the stations and correspondingly changing the frequencies capable of being received by the stations.

According to a second aspect of the invention there is provided a radio station for use in an area communications system, said station including means for transmitting signals at a predetermined frequency associated with the station and means for receiving signals at different frequencies from one or more other stations in the system, each of said transmitted signals comprising one or more packets of data each addressed to one or more of the other stations in the system.

In one embodiment, high gain antennae are used for transmission and reception, giving all-round response in azimuth, but only a narrow response angle in elevation.

In another embodiment, two mobile transmitters remote from the station can be used to transmit alternately. While one is transmitting, the other may be moved, so that each transmission is from a new location.

The data are also preferably encrypted before transmission and decrypted at the receiver stations.

The present invention may thus provide the following advantages as compared with the conventional systems:

1. There is more efficient spectrum usage and therefore greater traffic capacity and/or reduced transmission times, due to the transmission of addressed packets of data rather than speech.
2. The transmission range can be increased to 80–100 km over typical terrain, thereby avoiding the need for intermediate relay stations in usual battlefield communications (typically covering an area of 60×80 km), by using, for example, high gain antennae and transmissions with a narrow radio frequency bandwith.
3. A considerable saving is made in the manpower and equipment, required by alleviating the need for relay stations, trunk switching at such stations being replaced by appropriately addressing each data packet.
4. A considerable reduction is made in the number of frequencies needed as compared to a noded system. For example, for 20 stations 20 frequencies are needed with the present invention instead of a minimum of 126 frequencies when 30 intermediate stations are used in a noded system.
5. There is improved resistance to interception, jamming and physical attack as a result of transmitting data bursts at unpredictable frequencies from unpredictable locations and eliminating vulnerable relay stations.

The present invention will now be further described by way of example only with reference to the accompanying drawings of which:

FIG. 1 shows a radio station for use in a system according to one embodiment of the invention, and FIG. 2 shows a receiving and data processing control arrangement for the embodiment shown in FIG. 1.

A radio station 1 in FIG. 1 is one of a number of identical stations in an area communications system. The radio station 1 comprises a receiver antenna system 2 responsive to direct transmissions from each of the other radio stations in the system, one of which is shown at 3, with two remote transmitters 4 and 5 operated alternately, i.e. one can be moved whilst the other is transmitting. The antennae system 2 provides input signals to a receiver bank 6, each receiver being responsive to the current transmission frequency of a respective one of the other radio stations in the system. The received signals, comprising packets of data addressed to a particular station, are processed in decrypt section 7 and switch section 8, which are described in more detail hereinafter with reference to FIG. 2. After processing, the data packets are either passed to database 9, one of the workstations 10 or rejected, depending on the addressee of each packet. Data from the database 9 or any of the workstations 10 for transmission to specified addresses are processed and stored in the switch section 8 ready to be transmitted from one of the two remote transmitters 11, 12 during one or more subsequent transmission periods. Typically, there might be 20 radio stations in the system spread over an area of 60×80 km.

In the arrangement shown in FIG. 2, the receiver antennae system 2 comprises three high gain wideband elements 21, 22, 23 spaced approximately 10 wavelengths apart to form a triangle. This arrangement ensures that fading in the received transmissions does not occur simultaneously in all the antenna elements. Each antenna element gives all-round response in azimuth, with only a minimal response angle in the vertical, thus providing the high gain. As the receivers are passive, it is not necessary for the receiver antennae system to be remote from the station.

Receiver station 24 includes three radio-frequency multi-couplers 25A, 25B, 25C to match respective antennae element 21, 22, 23, to three identical banks of receivers 6A, 6B, 6C. Radio-frequency signals in each receiver are demodulated by means of a programmable frequency synthesiser 26 which acts as local oscillator. The three demodulated outputs of each receive channel (one per antenna element) are combined in a diversity combiner 27 and the combined outputs of each channel are decrypted at 7 after any necessary forward error correction has been completed.

Typically there would be nineteen working channels and a monitor channel for the local transmitter but only seven are shown in FIG. 2. A data quality check may be carried out for each channel by a storage visual display unit 28.

The demodulated, error corrected, and decrypted signals in the channels are passed to the switch 8 where the data are sorted and, if appropriately addressed, sent to one of the workstations 10 or database 9. Data not appropriately addressed are rejected. Each workstation or database is supported by an assembler-dissembler 29, which assembles or dissembles packets and which can acknowledge the receipt of an assembled message or call for a retransmission.

Data messages from the workstations 10 or database 9 are assembled into packets within the assembler-dissembler 29 and passed to the switch 8 where they are sent to the database 9 or to another workstation 10, if locally addressed, or ready for the next transmission. At the next transmission period the stored data are passed to one of the two remote transmitters 11 or 12 via an on-line encryption device 30.

A transmission controller and system clock 31, which is synchronised with similar clocks at each of the other stations, controls via a programmable transmit frequency synthesiser 32 the times and frequencies at which transmissions are made, and the channel settings of the programmable receive frequency synthesiser 26 so that each receiver bank 6 is tuned to demodulate radio frequency signals transmitted from other radio stations at the currently allotted respective frequencies.

In this way, the transmission and reception frequencies associated with each station in the system can be simultaneously changed at regular intervals to avoid interception, jamming and physical attack.

It is convenient to arrange the main radio station on four vehicles within the battlefield area; one vehicle carrying the receiver station 24, the receive frequency synthesiser 26 and the decryptor 7; another vehicle carrying the switch arrangement 8, the encryptor 30 and the transmission controller and clock 31; and the other two vehicles each carrying one of the transmitters 11 and 12 with their respective frequency synthesisers 32, 33. There will also be further vehicles each carrying one or more of the work stations 10 and the database 9. The vehicles carrying the receiver station and switch may be linked by multi-pair cable carrying the data received in the various receiver channels. The work stations may also be linked to the vehicle carrying the switch by cables carrying data. The vehicle carrying the switch may be linked to the vehicles carrying the transmitters by cable carrying data together with a control signal to the transmission frequency synthesiser. The vehicle carrying the switch may also be linked to the vehicle carrying the receiver station by cable carrying a control signal to the receive frequency synthesiser.

I claim:

1. A nodeless area communications system comprising a plurality of radio stations arranged for direct intercommunication, each radio station comprising a transmitter for transmitting signals at a respective transmission frequency associated with the station and differing from the transmission frequences of the other stations of the system, the signals being in the form of one or more packets of data and including one or more address codes for identifying the or each radio station to receive the signals, the stations being arranged to enable the signals to be transmitted continuously and simultaneously at their associated frequencies during a transmission period, each radio station further comprising a multi channel receiver arranged to enable simultaneous and direct reception of the signals transmitted continuously and simultaneously from any or all of the other stations at the associated transmission frequencies during a said transmission period, the receivers of the radio stations including means to identify the address code of any received packet of data and associated therewith, thereby to enable the simultaneous transmission and reception of the signals, in the form of the one or more packets of data, directly between any or all of the stations of the system at any time during the said transmission period.

2. A system according to claim 1 wherein the system also includes means for changing the respective transmission frequencies associated with the stations and correspondingly changing the frequencies capable of being received by the stations.

3. A system according to claim 1 comprising high gain antennae for transmission and reception, to give all-round response in azimuth, but only a narrow response angle in elevation.

4. A system according to claim 1 comprising two mobile transmitters remote from the station to transmit alternately.

5. A system according to claim 1 comprising means to effect encrypting of data before transmission and means to effect decrypting at the receiver stations.

6. A method of operating a nodeless area communications system including a plurality of radio stations, the method comprising, for each station in the system, transmitting signals directly to one or more of the other stations of the system at a transmission frequency associated with the station and differing from the transmission frequencies of the other stations, the signals being in the form of one or more packets of data and including one or more address codes for identifying the one or more of the other stations to receive the signals, and, at any station in the system, receiving directly from any other station or stations the signals transmitted by the other station or stations at the transmission frequency or frequencies of the other station or stations and identifying the address code associated with the said any station, the said stations being arranged to transmit their respective signals continuously and simultaneously at their associated transmission frequencies during a transmission period and to receive, simultaneously with their transmissions, the signals transmitted by any other stations directly from the said other station or stations.

7. A method according to claim 6 comprising changing the respective transmission frequencies associated with the stations and correspondingly changing the frequencies capable of being received by the stations.

8. A radio station for a nodeless area communications system, said station comprising a transmitter for transmitting signals at a transmission frequency associated with the station and arranged to differ from the transmission frequency of any other station of the system, the signals being in the form of one or more packets of data and including one or more address codes for identifying one or more radio stations to receive the signals, the station further comprising a multichannel receiver arranged to enable simultaneous direct reception of signals transmitted simultaneously by any one or more other stations at the transmission frequencies thereof and including means to identify the address code of any received packet of data for direct receipt thereby from said any one or more of the other stations.

* * * * *